Patented Feb. 20, 1940

2,191,257

UNITED STATES PATENT OFFICE 2,191,257

EGG WHITE MATERIAL AND PROCESS OF PREPARING THE SAME

Verne D. Littlefield, Beverly Hills, Calif., assignor to Armour and Company, Chicago, Ill., a corporation of Illinois No Drawing. Application August 10, 1937, Serial No. 158,431

16 Claims. (Cl. 99—210)

This invention relates to processes of preparing dried egg white products and to dried egg white products of superior whipping characteristics which are free of odors resulting from bacterial decomposition, and it comprises processes wherein the thick, raw egg whites as obtained from the egg are acidulated with a suitable acid until the pH value of the egg white lies between 5.5 and 5.8, this resulting in the formation of an insoluble flocculent precipitate, the egg white separated from the precipitate, and finally dried and aged.

The preparation of dried egg whites is an industry of increasing magnitude, and many thousands of dozens of eggs are processed daily. One of the most important outlets for dried egg whites is in the food industry. The dried product is purchased in cans by bakeries, candy-making establishments, and the like, and, before use, is generally admixed with water to "reconstitute" the egg white. The problem of preparing an egg white which can be reconstituted to give a satisfactory liquid product is a difficult one. The dried egg white must be one which, when admixed with water, will yield a voluminous and stable foam. The dried material must also be free of all obnoxious odors, an ideal which has not hitherto been satisfactorily realized.

Egg whites, as obtained from the egg, contain about 12% to 13% of solids. The whites are relatively thick and contain chalazae and stringy portions as well as albuminous and protein materials which make the egg white viscous. The prior art is replete with processes for liquefying the egg white, for removing chalazae, and for otherwise preparing the egg white for the drying operation. Such preliminary treatment is a necessary step before drying the egg whites, because ordinary egg whites, as freshly obtained from the egg, cannot be dried to give a satisfactory product. Untreated, dried egg whites will not give a stable foam after being reconstituted with water, and the volume of foam is unsatisfactory.

Consequently, as stated, the prior art has uniformly subjected the freshly obtained egg white to a pre-treatment operation prior to drying. Since my invention is intimately associated with pre-treatment processes generally, it will help in understanding my process if I briefly describe the prior art with respect to pre-treatment processes, and I shall then show how my process distinguishes from processes of the prior art.

For many years it has been recognized that if egg whites were allowed to "ripen," the heavier portions or viscosity-producing portions of the egg white would form an insoluble flocculent or gelatinous material which would rise to the surface as a scum. These heavier portions included chalazae and the stringy portions of the egg white as well as proteolytic decomposition products. This so-called ripening is a fermentation process requiring several days and gives products having an objectionable odor. The odor probably is the result of bacterial decomposition, and such odor will develop whenever the liquid egg white is held in bulk for any significant period of time at room temperature or above.

Prior art workers have endeavored to facilitate fermentation without the development of odor in various ways, but there is at the present time no satisfactory method of pre-treating egg whites using the principles of fermentation. It is axiomatic that prolonged fermentation results in the development of odor. Prior art workers have deliberately added protein ferments to speed up the rate of proteolysis without, however, avoiding decomposition due to bacteria. Others, for example, Rosner U. S. Patent 2,059,399, preliminarily acidify the egg white to a pH of between 5 and 6 and hold the acidified egg white for a period of about 24 hours at room temperature until a scum forms on the surface. This process necessarily involves fermentation, and the acid is added to speed up the rate at which proteolysis occurs. When the whites are held at room temperature for several hours bacterial action is inevitable and the finally dried egg white has a distinct odor indicative of putrefaction.

Fermentation has been necessary in order to make a dried product which would whip satisfactorily but as regards volume only. In the absence of fermentation no amount of aging, as for many days in containers, will improve the whipping characteristics to any great extent of products made hitherto.

But, even fermentation processes do not give products which will have high foam stability. The foams rapidly lose water within about ten minutes on standing, and prolonged whipping of the foam leads to breakdown.

In order to avoid fermentation of any kind others, such as in Fischer U. S. Patents 1,996,800 and 1,996,801, acidify to a pH of about 5.2 and immediately dry. Dried products made in this way, while somewhat more satisfactory than those made by a fermentation method, do not have completely satisfactory whipping characteristics, and aging does not help.

Thus the prior art processes can be roughly divided into two groups, the first of which, and which is represented by the largest amount of prior art, consists in some sort of fermentation process where the liquid egg white is allowed to stand for many hours. This, as stated, results in the formation of a product having unsatisfactory odor. When acidified prior to fermentation the product still has an unsatisfactory odor. Its foam volume will be satisfactory if there has been substantial fermentation but foam stability will be unsatisfactory. The second method or non-fermentation method, as at present practised consists in acidifying the egg whites to a pH of about 5.2 and then almost immediately drying.

Foaming characteristics of any dried egg white can be determined by a standardized whipping procedure. For example, one and one-half ounces of dried egg white material are agitated with fifteen ounces of water for a period of two minutes. The mixture is then more briskly agitated for a period of one and one-half minutes and finally whipped for another period of one and one-half minutes at higher speed. The characteristics of the thus obtained foam can be determined first by measuring the depth of the foam and second by determining its stability. The stability of the foam, or its so-called "dryness," is tested by putting a quantity of the foam in a funnel and noting the time when the first drop of water drips from the funnel. Dried egg whites made by the present invention have superior stability and will not show loss of water for a satisfactory period of time, usually at least thirty minutes.

I have discovered certain unobvious and unpredictable functions of the pH value of egg white, and as a result of my discoveries I have been able to prepare a dried egg white which, after aging and reconstitution with water, will give a liquid product which will whip to a foam of high volume and which is usually stable for at least thirty minutes. Moreover, my product is entirely free of any odors resulting from bacterial decomposition because it is substantially sterile. My process is a non-fermentation process, and I deliberately avoid any opportunity for fermentation to occur. Consequently, with the exception of the two Fischer patents noted above, my process has nothing in common with the prior art.

I have discovered that when raw liquid egg whites freshly separated from the egg, or thawed frozen egg white, are acidified progressively significant changes occur in the white. At a pH of 5.8 I find that a settleable flocculent precipitate forms. At pH values above 5.8 the flocculent material will not settle out. I have found that at pH values below 5.5 the insoluble flocculent material includes foam stabilizing agents. Thus, for example, if the pH value of the egg white is decreased to below 5.5 foam stabilizing agents initially present in the egg white are thrown out of solution. This means that when the pH of the egg white is reduced to below 5.5, the acidified whites separated from the flocculent sludge, and dried, the dried product, regardless of the extent of fermentation before drying or aging thereafter, can never regain its ability to form highly stable foams. That constituent in the egg white which forms a highly stable foam has been thrown out of solution.

I have also discovered that when the whites are acidified to a pH of between 5.5 and 5.8, and finally dried, they will, on aging, give a material having superior whipping characteristics, and the foam stability is such that no water is lost, even after the foam has stood for thirty minutes. Moreover, continuous whipping for extended periods does not result in breaking down the original foam volume obtained after two or three minutes whipping. This maintenance of foam volume over long periods of whipping time is important and is not characteristic of egg whites made by fermentation processes.

Consequently, the essence of the present invention is in acidulating the egg white until the pH value lies between 5.5 and 5.8, and preferably between 5.65 and 5.75, allowing the sludge of flocculent material to settle (or separating the sludge from the liquefied egg white by centrifugal action) and then immediately drying the egg white. Thus by reducing the pH to 5.8 I form a flocculent precipitate which can be settled so that the clear egg white solution above it can be decanted off. By stopping the acidification before the pH has reached 5.5 I am able to retain in the liquefied egg white the valuable foam-stabilizing constituents referred to. And by observing these pH ranges the above product, after aging, will give an excellent whip and stability when reconstituted with water.

My discovery helps to explain the reasons for lack of success in prior processes as regards foam stability. If, for example, the pH of the egg white is reduced to 5.2 it is apparent that the valuable foam-stabilizing agents are lost because they are thrown out as a flocculent precipitate at any pH value below 5.5 and aging will not restore them. Likewise, if the egg whites are acidified to any value above pH 5.8, such as pH 6.0, and then allowed to stand at room temperature for twenty-four hours or so, the hydrogen ion concentration will increase due to lactic acid formation and other acidic products formed from proteolytic decomposition. At the end of twenty-four hours standing, or that time required for chalazae and scum to separate, and for imparting whipping characteristics (as regards foam volume) to the finally dried product, the actual pH value of the egg white will be much below 5.5, and again the foam-stabilizing agents will be thrown out of solution. This explains why egg white made by fermentation processes will not have superior foam stability although its foam volume is satisfactory. Dried whites made by fermentation processes rarely show stability in excess of ten minutes.

As stated, my process in essence comprises the step of prelimnarily treating the egg whites prior to drying with an acid until the pH of the egg whites lies between 5.5 and 5.8. Ordinarily it takes only about thirty minutes for all of the acid to be added with agitation to a 15,000 pound charge of egg white. Temperature conditions in my process are such that bacterial action is inhibited, and no fermentation can occur because, as will presently be explained in detail, I advantageously perform practically all of the operations prior to drying at a temperature of about 45° to 50° F. After the acid has been added I allow the flocculent insoluble precipitate to settle over a period of about three hours and then draw off the supernatant clear egg whites and pump them to a drier. Obviously the length of time for settling will depend upon the volume of egg whites being treated. But in no sense is this settling time to be confused with a period of fermentation because no fermentation can possibly occur under my conditions, and the clear egg white is sent to the drier long before fermentation could take place.

Were I to acidify to a pH of, say 5.75, and then let the mixture stand for several hours, for example, ten to thirty-six hours, at room temperature, fermentation would be inevitable, lactic acid and other acidic products would form, the pH would decrease to below 5.5, foam-stabilizing agents would be thrown out of solution, and the very object of my invention would be defeated. The clear liquid I draw off for drying has a pH of between 5.5 and 5.8 and I am the first to purposely dry an egg white having this pH value.

I shall now describe my process in more specific detail.

The eggs are first collected and then chilled to a temperature of about 45° F. to inhibit any bacterial action after breaking. They are then candled so that those which are defective may be discarded, and then cracked and the yolks separated from the whites. The raw whites, at a temperature of about 45° F. are collected and filtered through a filter to remove chalazae and stringy portions. Next the whites are passed to a very large vat in a room maintained at a temperature of about 45° to 50° F., and when about 15,000 pounds of the egg whites have been collected dilute hydrochloric acid is added until the pH is from 5.5 to 5.8 and preferable about 5.65 to 5.75. During the addition of acid, which is customarily done with agitation, portions of the egg white material are subjected to electrometric measurement for accurately determining the pH. On the average, about 5.2 pounds of hydrochloric acid having a specific gravity of 1.18 are added to each one thousand pounds of egg whites. The acid is first diluted from five to ten volumes of water before addition to egg whites. After all the acid has been added and the pH of the mixture determined to be within the range stated, the mixture is allowed to stand for about thirty minutes to one hour at 45° to 50° F. (merely long enough to let the precipitate settle) and then the clear liquid lying just beneath a thin layer of froth is pumped off, advantageously passed through a filter and sent to a spray-drier. This filtration operation is optical and is only for the purpose of preventing any small particles of insolubles from clogging the nozzle of the spray-drier. These nozzles are of extremely minute size. The froth referred to above is a very light froth unavoidably formed as the egg white discharges into the vat and as the mixture is agitated during the addition of hydrochloric acid. The froth is in no sense a scum of stringy portions or chalazae and most of the foam eventually breaks down to a liquid condition. It requires about three hours to pump a relatively clear acidulated egg white from the large vat to the spray-driers. But this time is, of course, a function of the quantity of liquid.

The pre-filtration prior to acidification removes practically all of the chalazae and stringy portions. The acidification converts the very thick portions of the egg white to an insoluble flocculent material which, at the pH values stated, will settle readily. At no time do I obtain a scummy material indicative of advanced fermentation.

My acidified whites are clear, free flowing liquids readily pumped from the vat. The liquid is sent to the spray driers just as soon as the flocculent insoluble material therein has settled. I avoid prolonged standing in the vat since it is the very essence of my invention to avoid any ripening or fermentation. For reasons pointed out above, this would defeat the objects of my invention.

Instead of allowing the flocculent insoluble precipitate to settle I can separate a clear liquid white from the precipitate in a centrifuge. For all ordinary purposes, however, equally good results are obtained by allowing the precipitate to settle.

After the substantially clear liquefied egg white has been drawn off from the vat the flocculent precipitate can be washed with water to recover any occluded egg white therein. This is a simple washing operation and consists in diluting the precipitate with water, allowing a further separation of flocculent materials to occur and then pumping off the clear liquid from above the gelatinous precipitate. This clear liquid can be added to further quantities of material being sent to the spray-driers.

The drying operation is the usual one conventional in this art and I shall not describe it in detail. The spray drying operation involves no difficulties and is conducted under the conditions usual for materials of this kind. Pan-drying can be used instead of spray-drying.

During the drying, hydrochloric acid in the egg white vaporizes so that the final dry product is free of any hydrochloric acid. When other acids customarily used in this art, such as lactic, citric, phosphoric, tartaric and others noted in the Fischer and Rosner patents are employed, it is advantageous to neutralize the acid before drying the product. This can be done readily by first acidifying to the values stated above, drawing off the clear supernatant egg white into a second vat, adding a neutralizing agent, such as ammonia or other alkalies thereto, and then subjecting the neutralized material to spray-drying.

Although it is best to keep the egg white chilled to a temperature of about 45°–50° F. during all operations prior to drying, I can separate the whites, acidify, settle the sludge and pump to the driers at room temperature without danger of substantial fermentation or decomposition. This is because the flocculent precipitate, at the pH stated, settles readily so no long holding time (which might lead to decomposition) is necessary. Room temperatures, such as 70° F., are best used with quantities of white smaller than 15,000 pounds so that settling of precipitate, and pumping operations are of shorter duration. So long as conditions of time and temperature are such that no fermentation occurs my process will give the superior, odorless dried products stated.

My dried product is new in this art. It is entirely free of any odor indicative of bacterial putrefaction, consequently, it differs from all egg white products hitherto made by ripening or fermentation processes. My product has superior foam stability. Its stability, after aging for a period of 60 to 90 days, is such that when admixed with water and whipped under the standardized whipping procedure noted above, there will be no loss of water from the foam for a period of about 50 minutes. No one has hitherto been able to prepare an egg white by any process which has such high stability. Consequently, I claim my product as a new material by reference to the fact that it contains naturally occurring foam stabilizing agents soluble at a pH between 5.5 and 5.8 and is free of any bacterial decomposition products.

My dried product would be substantially neutral since during drying the hydrochloric acid is driven out. Some of the acid may be bound by the protein material present. The pH of my dried product would be about 6.5, varying from about 6.0 to above 7.0 in case the acid is neutralized by an alkali prior to drying.

Having thus described my invention, what I claim is:

1. The process of preparing an egg white product which includes acidifying raw liquid egg whites to a pH of between 5.5 and 5.8, separating the flocculent precipitate thus formed from the liquid egg whites before fermentation occurs therein and while the pH of the whites is within the range stated, and drying the separated egg whites before any substantial fermentation has occurred therein.

2. The process of preparing an egg white material which includes acidifying raw egg whites to a pH of between 5.5 and 5.8, allowing the mixture to stand until the flocculent precipitate thus formed settles, drawing off the clear liquid egg white before fermentation occurs therein and while the pH of the whites is within the range stated, and drying the liquid egg white before any substantial fermentation has occurred therein.

3. The process of preparing an egg white material which includes acidifying raw egg whites to a pH of between 5.5 and 5.8, separating the flocculent material thus formed from the clear liquid egg white while the pH of the whites is within the range stated, and spray drying the liquid egg white before any substantial fermentation has occurred therein.

4. The process of preparing an egg white material which includes acidifying raw egg whites to a pH of between 5.5 and 5.8, allowing the mixture to stand until the flocculent precipitate thus formed settles, drawing off the clear liquid egg whites before fermentation occurs therein and while the pH of the whites is within the range stated, and spray-drying the liquid egg whites before any substantial fermentation has occurred therein.

5. The process of preparing an egg white material which includes adding hydrochloric acid to raw egg whites until the pH thereof lies between 5.5 and 5.8, separating the clear liquid egg whites from the flocculent sludge thus formed, before fermentation occurs in the whites and while the pH of the whites is within the range stated, and then drying the liquid whites before any substantial fermentation has occurred therein.

6. The process of preparing an egg white material which includes acidifying raw egg whites until the pH thereof lies between 5.5 and 5.8, allowing the flocculent precipitate thus formed to settle, drawing off a clear liquid egg white before fermentation has occurred therein and while the pH of the whites is within the range stated, and spray drying the liquid egg white before any substantial fermentation has occurred therein.

7. The process of preparing an egg white material which includes acidifying raw egg whites to a pH of 5.5 to 5.8, maintaining the acidified egg whites at a temperature of about 45° to 50° F. while the thus formed flocculent precipitate therein settles, withdrawing the clear egg white after the precipitate has settled and while the pH of the whites is within the range stated, and drying the liquid whites before any substantial fermentation has occurred therein.

8. The process of preparing an egg white material which includes acidifying raw egg whites to a pH of 5.5 to 5.8, maintaining the acidified egg whites at a temperature of 45° to 50° F. while the thus formed flocculent precipitate therein settles, withdrawing the clear egg white after the precipitate has settled and while the pH of the whites is within the range stated, and spray drying the liquid whites before any substantial fermentation has occurred therein.

9. The process of preparing an egg white material which includes straining raw egg whites to remove stringy portions and chalazae, adding hydrochloric acid to the whites until the pH thereof lies between 5.5 and 5.8 while maintaining the whites at a temperature below that at which fermentation will proceed, separating a clear liquid white from the flocculent sludge of insoluble material before fermentation has occurred in the whites and while the pH of the whites is within the range stated, and drying the clear liquid white before any substantial fermentation has occurred therein.

10. The process as in claim 9 wherein the flocculent precipitate is allowed to settle and the clear whites are withdrawn from above the precipitate.

11. The process of preparing an egg white material which includes acidifying raw egg whites to a pH lying between 5.5 and 5.8, separating clear liquid egg white from the flocculent precipitate thus formed and while the pH of the whites is within the range stated, and spray drying the clear liquid egg white before any substantial fermentation has occurred therein, the temperature conditions and time of treatment during the acidification and separation of clear liquid egg white being such that fermentation of the egg white does not occur.

12. The process as in claim 11 wherein the egg white, after separation from the flocculent precipitate is neutralized prior to drying.

13. The process as in claim 1 wherein the egg white, after separation from the flocculent precipitate, is neutralized prior to drying.

14. As a new material unfermented dried egg whites containing foam stabilizing agents occurring naturally in raw egg white and soluble in aqueous egg white solutions having a pH of 5.5 to 5.8, being free of flocculent materials insoluble in aqueous egg white solutions having a pH of 5.5 to 5.8, and being free of odors indicative of bacterial decomposition.

15. The process of preparing an egg white material which comprises acidifying liquid egg white to a pH of 5.5 to 5.8, straining the thus acidified whites to free them of insoluble material before any substantial fermentation occurs therein, and drying the strained whites before any substantial fermentation occurs therein.

16. The process which comprises acidifying liquid egg white to a pH of 5.5 to 5.8, straining the acidified white before any substantial fermentation occurs therein, adding a neutralizing agent to the strained acidified white, and drying the white before any substantial fermentation occurs therein.

VERNE D. LITTLEFIELD.